United States Patent
Schroedle et al.

(10) Patent No.: US 10,069,144 B2
(45) Date of Patent: Sep. 4, 2018

(54) SPHERICAL PARTICLES, PRODUCTION AND USE THEREOF

(71) Applicant: BASF SE, Ludwigshafen (DE)

(72) Inventors: Simon Schroedle, Westfield, NJ (US); Martin Schulz-Dobrick, Mannheim (DE)

(73) Assignee: BASF SE, Ludwigshafen (DE)

( * ) Notice: Subject to any disclaimer, the term of this patent is extended or adjusted under 35 U.S.C. 154(b) by 279 days.

(21) Appl. No.: 14/889,663

(22) PCT Filed: May 2, 2014

(86) PCT No.: PCT/EP2014/058966
§ 371 (c)(1),
(2) Date: Nov. 6, 2015

(87) PCT Pub. No.: WO2014/180743
PCT Pub. Date: Nov. 13, 2014

(65) Prior Publication Data
US 2016/0118662 A1    Apr. 28, 2016

(30) Foreign Application Priority Data

May 8, 2013 (EP) .................................... 13167005

(51) Int. Cl.

| | |
|---|---|
| *H01M 4/58* | (2010.01) |
| *C01G 53/00* | (2006.01) |
| *H01M 4/505* | (2010.01) |
| *H01M 4/525* | (2010.01) |
| *H01M 4/48* | (2010.01) |
| *H01M 4/50* | (2010.01) |
| *H01M 4/52* | (2010.01) |
| *H01M 10/0525* | (2010.01) |
| *H01M 4/131* | (2010.01) |
| *H01M 4/62* | (2006.01) |
| *H01M 10/052* | (2010.01) |
| *H01M 4/02* | (2006.01) |

(52) U.S. Cl.
CPC ........ *H01M 4/5825* (2013.01); *C01G 53/006* (2013.01); *C01G 53/44* (2013.01); *H01M 4/48* (2013.01); *H01M 4/50* (2013.01); *H01M 4/505* (2013.01); *H01M 4/52* (2013.01); *H01M 4/525* (2013.01); *H01M 10/0525* (2013.01); *H01M 4/131* (2013.01); *H01M 4/62* (2013.01); *H01M 10/052* (2013.01); *H01M 2004/021* (2013.01); *H01M 2220/20* (2013.01); *H01M 2220/30* (2013.01)

(58) Field of Classification Search
CPC ........ H01M 4/5825; H01M 4/48; H01M 4/50; H01M 4/505; H01M 4/52; H01M 4/525; H01M 10/0525; H01M 4/02; H01M 4/131; H01M 4/62; C01G 53/006; C01G 3/44

See application file for complete search history.

(56) References Cited

U.S. PATENT DOCUMENTS

| | | |
|---|---|---|
| 6,274,273 B1 | 8/2001 | Cho et al. |
| 2009/0068561 A1 | 3/2009 | Sun et al. |
| 2009/0309063 A1 | 12/2009 | Paulsen et al. |
| 2012/0080649 A1 | 4/2012 | Koenig, Jr. et al. |
| 2015/0053890 A1 † | 2/2015 | Sun |

FOREIGN PATENT DOCUMENTS

| | | |
|---|---|---|
| EP | 2 833 446 A1 | 2/2015 |
| KR | 10-0752703 B1 † | 8/2007 |
| KR | 10-2011-0083383 A † | 7/2011 |
| WO | WO 2007/114557 A1 | 10/2007 |
| WO | WO 2008/092568 A1 | 8/2008 |

OTHER PUBLICATIONS

International Preliminary Report on Patentability dated Oct. 26, 2015 in PCT/EP2014/058966 (with English language translation).
U.S. Appl. No. 14/889,577, filed Nov. 6, 2015, Simon Schroedle, et al.
U.S. Appl. No. 14/889,602, filed Nov. 6, 2015, Simon Schroedle, et al.
U.S. Appl. No. 14/889,928, filed Nov. 9, 2015, Simon Schroedle.
International Search Report dated Jun. 26, 2014 in PCT/EP2014/058966 (with English language translation).
Gary M. Koenig, Jr., et al., "Composition-Tailored Synthesis of Gradient Transition Metal Precursor Particles for Lithium-Ion Battery Cathode Materials" Chemistry of Materials, vol. 23, 2011, pp. 1954-1963.
K.K. Cheralathan, et al., "Preparation of spherical $LiNi_{0.50}Co_{0.15}Mn_{0.05}O_2$ lithium-ion cathode material by continuous co-precipitation" Journal of Power Sources, vol. 195, 2010, pp. 1486-1494.
Zhenlei Huang, et al., "Well-ordered spherical $LiNi_xCo_{(1-2x)}Mn_xO_2$ cathode materials synthesized from cobolt concentration-gradient precursors" Journal of Power Sources, vol. 202, 2012, pp. 284-290.
Yang-Kook Sun, et al., "A novel concentration-gradient $Li[Ni_{0.83}Co_{0.07}Mn_{0.10}]O_2$ cathode material for high-energy lithium-ion batteries" Journal of Materials Chemistry, vol. 21, 2011, pp. 10108-10112.
Yang-Kook Sun, et al., "A Novel Cathode Material with a Concentration-Gradient for High-Energy and Safe Lithium-Ion Batteries" Advanced Functional Materials, vol. 20, 2010, pp. 485-491.
Yang-Kook Sun, et al., "High-voltage performance of concentration-gradient $Li[Ni_{0.67}Co_{0.15}Mn_{0.18}]O_2$ cathode material for lithium-ion batteries" Electrochimica Acta, vol. 55, 2010, pp. 8621-8627.

(Continued)

*Primary Examiner* — Helen Oi K Conley
(74) *Attorney, Agent, or Firm* — Oblon, McClelland, Maier & Neustadt, L.L.P.

(57) ABSTRACT

Spherical particles of transition metal carbonates, transition metal hydroxides or transition metal carbonate hydroxides comprising cations of at least two transition metals selected from nickel, cobalt, manganese, titanium, vanadium, chromium and iron, wherein the concentration of at least one of the transition metal cations, plotted against the radius of the particle in question, has at least one relative extreme value which is neither in the center nor at the edge of the particle in question.

18 Claims, No Drawings

(56) References Cited

OTHER PUBLICATIONS

Yang-Kook Sun, et al., "High-energy cathode material for long-life and safe lithium batteries" Nature Materials, vol. 8, Apr. 2009, pp. 320-324.

Gu Da-Ming, et al., "Electrochemical Performance of $LiCoO_2$ Gradient Coated $LiNi_{0.96}Co_{0.04}O_2$ Cathode" Chinese Journal of Inorganic Chemistry, vol. 21, No. 5, May 2005, pp. 725-728 (with English Abstract).

Zonghai Chen, et al., "Advanced cathode materials for lithium-ion batteries" MRS Bulletin, vol. 36, Jul. 2011, pp. 498-505.

† cited by third party

SPHERICAL PARTICLES, PRODUCTION AND USE THEREOF

The present invention relates to spherical particles of transition metal carbonates, transition metal hydroxides or transition metal carbonate hydroxides comprising cations of at least two transition metals selected from nickel, cobalt, manganese, titanium, vanadium, chromium and iron, wherein the concentration of at least one of the transition metal cations, plotted against the radius of the particle in question, has at least one relative extreme value which is neither in the center nor at the edge of the particle in question.

The present invention further relates to a process for producing the inventive spherical particles. The present invention further relates to lithiated mixed transition metal oxides which can be produced with the aid of inventive particles, and to the use of lithiated mixed transition metal oxides thus produced.

Storing energy has long been a subject of growing interest. Electrochemical cells, for example batteries or accumulators, can serve to store electrical energy. As of recently, lithium ion batteries have enjoyed particular interest. They are superior to the conventional batteries in some technical aspects. For instance, they can be used to produce voltages unobtainable with batteries based on aqueous electrolytes.

In lithium ion batteries, the materials from which the electrodes are made, and more particularly the material from which the cathode is made, play an important role.

In many cases, lithium-containing mixed transition metal oxides are used as the active material, especially lithium-containing nickel-cobalt-manganese oxides.

Problems arise in many batteries as a result of inadequate cycling stability, especially at elevated temperature, for example at 35 to 60° C., and of the lifetime and the reliability, especially with respect to short circuits, in the event of mechanical damage to the battery or in the event of excessive thermal stress, and these are still in need of improvement. A further problem is the evolution of gas, which can lead to rapid failure of the battery especially in the case of nickel-rich cathode materials. A further problem which has not yet been finally solved is the power durability (rate capability).

Some authors propose solving such problems by making what are called gradient materials or core-shell materials. For instance, Y.-K. Sun et al. in *J. Mater. Sci.* 2011, 21, 10108 propose materials having a very high nickel content, the particles having a nickel content of 83 mol % and the core a nickel content of 90 mol %.

The problem addressed was thus that of providing cathode materials for lithium ion batteries which have an improved rate capability and cycling stability, especially at relatively high operating temperatures (35 to 60° C.), but without having to accept disadvantages in terms of specific capacity and hence energy density. A further problem addressed was that of providing a process for producing cathode materials for lithium ion batteries having improved rate capability and cycling stability, especially at relatively high operating temperatures (35 to 60° C.), without having to accept disadvantages in terms of energy density.

It has been found that the precursor of the cathode material has a crucial influence on the cathode material. Accordingly, the precursors defined at the outset have been found, these being obtained in the form of spherical particles and also being referred to in the context of the present invention as inventive spherical particles or else as inventive particles for short.

Inventive particles have an essentially spherical shape. In this context, spherical particles shall include not just those which are exactly spherical but also those particles in which the maximum and minimum diameters of at least 95% (numerical average) of a representative sample differ by not more than 25%, preferably not more than 15%. In a specific embodiment of the present invention, inventive particles are exactly spherical.

Inventive particles may have a median diameter (D50) in the range from 0.1 to 35 µm, preferably 1 to 30 µm and more preferably 2 to 20 µm, measured, for example, by light scattering. Suitable equipment is commercially available, for example Malvern Mastersizer.

In one embodiment of the present invention, inventive spherical particles have a narrow particle diameter distribution. Thus, it is preferable that the following inequations are satisfied: $(D10) \geq 0.5 \cdot (D50)$ and $(D90) \leq 1.7 \cdot (D50)$.

Inventive particles may be in the form of agglomerates of primary particles. Corresponding primary particles may have, for example, a mean diameter in the range from 50 nm to 500 nm.

Inventive particles are particles of transition metal carbonates, transition metal hydroxides or transition metal carbonate hydroxides. Transition metal carbonates shall also be understood to mean basic transition metal carbonates, and transition metal hydroxides shall also be understood to mean transition metal oxyhydroxides, but in which the anions in the case of the transition metal carbonates are carbonate ions to an extent of more than 50 mol % and the anions in the case of the transition metal hydroxides are hydroxide ions to an extent of more than 50 mol %.

In one embodiment, the anions in the case of the transition metal carbonates are carbonate ions to an extent of up to 99.9 mol %, preferably to an extent of up to 99.5 mol %, based on all anions in the inventive particle in question.

In one embodiment, the anions in the case of the transition metal hydroxides are hydroxide ions to an extent of up to 99.9 mol %, preferably to an extent of up to 99.5 mol %, based on all anions in the inventive particle in question.

In one embodiment, the anions in the case of the transition metal carbonate hydroxides are carbonate ions and hydroxide ions to an extent of up to 99.9 mol %, preferably to an extent of up to 99.5 mol %, for example in a molar ratio in the range from 1:10 to 10:1, based on all anions in the inventive particle in question.

Further anions, for example at least 0.1 mol %, preferably at least 0.5 mol %, may, for example, be oxide ions or counterions of salts which are used as a raw material for production of inventive spherical particles, for example sulfate ions, halide ions, nitrate ions or carboxylate ions, for example acetate.

In one embodiment of the present invention, inventive particles comprise cations of at least two transition metals selected from nickel, cobalt, manganese, titanium, vanadium, chromium and iron, preferably the cations of at least three of the aforementioned transition metals.

In one embodiment of the present invention, inventive particles comprise predominantly, for example to an extent of at least 90 mol %, based on all cations, the cations of at least two transition metals selected from nickel, cobalt, manganese, titanium, vanadium, chromium and iron, preferably to an extent of at least 95 mol %, preferably the cations of at least three of the aforementioned transition metals.

In one embodiment of the present invention, inventive particles may comprise cations of manganese, cobalt and nickel and optionally of at least one further transition metal.

In one embodiment of the present invention, inventive particles may comprise predominantly, for example to an extent of at least 90 mol %, cations of manganese, cobalt and nickel and optionally of at least one further transition metal.

Preferably, inventive particles comprise unmeasurable or only very small proportions of lithium, for example no more than in the range from 0.0001 to 0.001% by weight, based on transition metal cations.

In one embodiment of the present invention, the concentration of nickel in inventive particles is in the range from 40 to 80 mol %, determined over the radius of the particle in question, where mol % is based on all transition metals. This means, in the context of the present invention, that the concentration of nickel ions throughout the particle in question is 40 mol % or higher and 80 mol % or less.

It is a characteristic feature of inventive particles that the concentration of at least one of the transition metal cations, plotted against the radius of the particles in question, has at least one relative extreme value which is neither in the center nor at the edge of the particle in question, for example the concentration of nickel cations or manganese cations. Preferably, the concentrations of at least two different transition metal cations plotted against the radius of the particle in question each have at least one extreme value, the extreme values preferably being complementary to one another; for example, the concentration of one transition metal has a relative maximum and the concentration of a second transition metal a relative minimum.

In this context, concentration differences in the range of ±1 mol % or less, based on relative maximum and relative minimum, shall not be considered as extreme values in the context of the present invention.

In this context, the concentration of the cations in question need not change over the entire radius of the particle in question, but may, in one variant, change over part of the radius, for example in half, especially in the outer half, the concentrations being essentially constant over the other half. In a preferred embodiment of the present invention, in the case of those inventive particles having a mean diameter in the range from 6 to 30 µm, preferably to 15 µm, the concentration of the respective transition metal cations in a core, for example having a diameter of up to 5 µm, is essentially constant, and varies outside the core as described above.

It is preferable when the concentration of at least one of the transition metals plotted against the radius of the particle in question has at least one turning point. It is especially preferable when the point the concentrations of at least two different transition metal cations plotted against the radius of the particle in question each have at least one turning point, the turning points preferably being complementary to one another.

It is very especially preferable when the concentrations of at least two transition metal cations have several relative extremes and a corresponding number of turning points, for example the concentrations of nickel cations and manganese cations.

In one embodiment of the present invention, inventive particles have a constant concentration of cobalt over the diameter.

In one embodiment of the present invention, inventive particles have a constant concentration of manganese over the diameter.

In one embodiment of the present invention, the concentration of one or preferably two of the transition metal cations has extreme values and optionally turning points, but the concentration of a third transition metal is essentially constant, for example on the scale of ±0.1 mol %.

In a very particularly preferred embodiment of the present invention, the concentrations of nickel and of manganese have relative extreme values, and the concentration of cobalt remains essentially constant.

In one embodiment of the present invention, within the inventive particle in question, the concentration of the cations of at least one of the transition metals may change in the manner of a constant function or in steps of not more than 10 mol %, for example in the manner of a constant function or in steps of not more than 5 mol %, for example in steps of 2 to 7 mol %.

In one embodiment of the present invention, within the inventive spherical particle in question, the concentration of the cations of at least one of the transition metals between two relative extreme values may differ by at least 6 mol %, preferably by at least 10 mol %.

When the concentration of transition metal cations changes in steps of not more than 10 mol % or preferably in steps of 2 to 7 mol %, layers with constant composition may form in inventive particles. Such layers may have, for example, a thickness in the range from 0.2 to 5 µm, in which case those particles which have a diameter of at least 10 µm may have, for example, layers having a maximum thickness of 0.5 µm.

In one embodiment of the present invention, inventive particles on average have a composition corresponding to the following formula (I):

$$Ni_aCo_bMn_cM_dO_e(OH)_f \qquad (I)$$

in which the variables are defined as follows:

M is Mg or Al and/or one or more transition metals selected from Fe, Cr and V, a is in the range from 0.4 to 0.8, preferably 0.48 to 0.65,
b is in the range from 0.1 to 0.4, preferably 0.15 to 0.25,
c is in the range from 0.1 to 0.5, preferably 0.15 to 0.35,
d is in the range from zero to 0.2, preferably zero to 0.02,
where: a+b+c+d=1,
e is in the range from zero to 1, preferably 0.5 to 0.8,
f is in the range from 0.5 to 2, preferably 1.1 to 1.6,
and where the mean oxidation state of Ni, Co and Mn is in the range from 2.1 to 3.2.

In this context, the mean oxidation state of Ni, Co and Mn is understood to mean the oxidation state averaged over all transition metals in the inventive particle in question.

In another embodiment of the present invention, inventive particles on average have a composition corresponding to the following formula (I a):

$$Ni_{a'}Co_{b'}Mn_{c'}M_{d'}O_{e'}(OH)_{f'} \qquad (I\ a)$$

in which the variables are defined as follows:

M is Mg and/or one or more transition metals selected from Fe, Cr and V, a' is in the range from 0.1 to 0.4, preferably 0.18 to 0.35,
b' is in the range from zero to 0.3, preferably 0.1 to 0.3,
c' is in the range from 0.4 to 0.75, preferably 0.48 to 0.67,
d' is in the range from zero to 0.2, preferably zero to 0.05,
where: a'+b'+c'+d'=1,
e' is in the range from zero to 1.2, preferably 0.1 to 0.6,
f' is in the range from 0.5 to 2, preferably 1.0 to 1.9,
and where the mean oxidation state of Ni, Co and Mn is in the range from 2.1 to 3.2.

In one embodiment of the present invention, inventive particles on average have a composition corresponding to the following formula (II):

$$Ni_aCo_bMn_cM_dO_e(OH)_j(CO_3)_h \qquad (II)$$

in which the variables are defined as follows:

M is Mg and/or one or more transition metals selected from Fe, Cr and V a' is in the range from 0.1 to 0.4, preferably 0.18 to 0.35,
b' is in the range from zero to 0.3, preferably 0.1 to 0.3,
c' is in the range from 0.4 to 0.75 preferably 0.48 to 0.67,
d' is in the range from zero to 0.2, preferably zero to 0.05,
where: a'+b'+c'+d'=1,
e' is in the range from zero to 0.6, preferably zero to 0.2,
h is in the range from 0.4 to 1, preferably 0.7 to 1,
j is in the range from zero to 0.2, preferably 0.01 to 0.1.

Inventive particles are very suitable for production of electrode materials for lithium ion batteries, especially lithiated (lithium-containing) mixed transition metal oxides.

The present invention further provides a process for producing inventive particles, also called inventive production process for short. The inventive production process is preferably a process comprising several steps. In a preferred embodiment of the present invention, the inventive production process has the following steps:

(A) providing an aqueous solution of at least one alkali metal (hydrogen)carbonate or at least one alkali metal hydroxide and optionally at least one compound L, (B) providing at least two aqueous solutions (B1) and (B2) of transition metal salts which comprise at least two transition metals overall, the aqueous solutions (B1) and (B2) having different molar ratios of the transition metals, (C) performing a precipitation of mixed transition metal carbonates, transition metal hydroxides or transition metal carbonate hydroxides in a stirred tank cascade of at least two stirred tanks or in a batch reactor, bringing about precipitations at different transition metal concentrations by (C1) feeding solutions (B1) and (B2) into various stirred tanks of the stirred tank cascade or by (C2) feeding solutions (B1) and (B2) into the batch reactor at different times or in different amounts, (D) removing the spherical particles thus precipitated.

For performance of step (A), at least one alkali metal hydroxide, for example potassium hydroxide or preferably sodium hydroxide, or at least one alkali metal (hydrogen)carbonate, is dissolved in water. The corresponding solution is also called "solution (A)" in the context of the present invention.

Examples of alkali metal hydroxide, alkali metal carbonate and alkali metal hydrogencarbonate are selected from sodium hydroxide, potassium hydroxide, sodium carbonate, potassium carbonate, sodium hydrogencarbonate and potassium hydrogencarbonate, and from mixtures thereof.

In one embodiment of the present invention, solution (A) has a concentration of alkali metal hydroxide in the range from 1 to 50% by weight, preferably 10 to 25% by weight. In another embodiment of the present invention, solution (A) has a concentration of alkali metal (hydrogen)carbonate in the range from 1% by weight up to a maximum of a saturated solution, in the case of $NaHCO_3$ up to about 10% by weight, in the case of $Na_2CO_3$ up to 21.5% by weight, in each case at 20° C., or more in the case of a correspondingly higher temperature.

In one embodiment of the present invention, an excess of alkali metal hydroxide or alkali metal (hydrogen)carbonate is used, based on transition metal. The molar excess may, for example, be in the range from 1.1:1 to 100:1. In a preferred embodiment of the present invention, stoichiometric amounts of alkali metal hydroxide or alkali metal (hydrogen)carbonate are employed, based on transition metal.

Solution (A) may comprise at least one compound L. Compound L may serve as a ligand for at least one of the transition metals. For example, L may be an organic amine or especially ammonia. Water in the context of the present invention should not be regarded as a compound L.

In a preferred embodiment of the present invention, a sufficient amount of ligand L, more preferably a sufficient amount of ammonia, is used that in the range from 0.05 to 1 mol/l, preferably 0.1 to 0.7 mol/l, of ligand L or ammonia are measured in the mother liquor. Very particular preference is given to amounts of ammonia for which the nickel solubility in the mother liquor is not more than 1000 pm, more preferably not more than 500 ppm. "Ammonia concentration" is understood to mean the concentration of ammonia including ammonium. Accordingly, organic amines are also understood to mean organic protonated amines.

For performance of step (B), at least two different solutions (B1) and (B2) comprising at least two different transition metals overall are made up, specifically in the form of water-soluble salts, the aqueous solutions (B1) and (B2) having different molar ratios of the transition metals. "Water-soluble" is understood to mean that the transition metal salt in question dissolves in distilled water at 20° C. to an extent of at least 10 g/l, preferably at least 50 g/l. Examples are the halides, nitrates, acetates and especially the sulfates of nickel, cobalt, manganese, titanium, vanadium, chromium and iron, preferably in the form of their aquo complexes.

In one embodiment of the present invention, the aqueous solutions (B1) and (B2) comprise cations of at least two different transition metals in each case, preferably of at least three different transition metals.

For the aqueous solutions (B1) and (B2), the concentrations can be selected within wide ranges. Preferably, the concentrations are selected such that they are within the range from a total of 1 to 1.8 mol of transition metal/kg of solution, more preferably 1.5 to 1.7 mol of transition metal/kg of solution.

The aqueous solutions (B1) and (B2) may have a pH in the range from 4 to 7.

Preferably, neither aqueous solution (B1) nor aqueous solution (B2) comprises ligand L.

In one embodiment of the present invention, the proportion of at least one of the transition metals in aqueous solution (B1) differs by at least 5 mol % from the proportion in aqueous solution (B2). For example, the proportion of $Ni^{2+}$ in aqueous solution (B1) may be at least 5 mol % higher than in (B2). For example, the proportion of $Mn^{2+}$ in aqueous solution (B1) may be at least 5 mol % lower than in (B2). Proportions in this context are based on overall transition metal.

For performance of step (C) of the process according to the invention, the procedure is to perform a precipitation of mixed transition metal carbonates, transition metal hydroxides or transition metal carbonate hydroxides in a stirred tank cascade of at least two stirred tanks or in a batch reactor, precipitations being brought about at different transition metal concentrations by (C1) feeding aqueous solutions (B1) and (B2) into various stirred tanks of the stirred tank cascade or by (C2) feeding solutions (B1) and (B2) into the batch reactor at different times or in different amounts.

Through the performance of step (C), precipitations are brought about at different transition metal concentrations. This is understood to mean that different concentrations of transition metal cations and different ratios of the concentrations of the transition metal cations used are present in the liquid phase over time—variant (C2)—or locally—variant (C1). The ratio of the concentrations of the transition metal cations used which is present at the particular site in the stirred tank cascade or at the particular time of precipitation in the batch reactor then determines the composition of the various layers or sites in the inventive particles.

During step (C), it is preferably also possible to meter in solution (A) without or with ligand L.

In one variant, during step (C), solution (A) and, separately therefrom, ligand L, or two solutions (A), one of which additionally comprises ligand L and the other does not, are metered in.

For performance of step (C), the procedure is preferably to work at molar ratios of at least two of the transition metal cations, for example $Ni^{2+}$, $Mn^{2+}$ and optionally $Co^{2+}$, which vary during the precipitation, the concentration of at least one of the transition metal cations, for example $Ni^{2+}$ or $Mn^{2+}$ or optionally $Co^{2+}$, passing through at least one local minimum or a local maximum during the precipitation or preferably additionally at least one turning point. For this purpose, if it is desirable to work in a batch reactor, different solutions comprising the corresponding transition metal cations can be metered in over the course of the precipitation. If it is desirable to work in a stirred tank cascade, different aqueous solutions (B1) and (B2) comprising the corresponding transition metal cations can be metered into the various stirred tanks.

For performance of step (C), the procedure is preferably to work at molar ratios of $Ni^{2+}$, $Mn^{2+}$ and optionally $Co^{2+}$ which vary during the precipitation, the concentration of at least one of the transition metals, for example $Co^{2+}$ or preferably $Ni^{2+}$ and/or $Mn^{2+}$ passing through at least one local minimum or a local maximum during the precipitation or preferably additionally at least one turning point. For this purpose, if it is desirable to work in a batch reactor, different aqueous solutions (B1) and (B2) comprising nickel salt, manganese salt and optionally cobalt salt can be metered in over the course of the precipitation. If it is desirable to work in a stirred tank cascade, different aqueous solutions (B1) and (B2) comprising nickel salt, manganese salt and optionally cobalt salt can be metered into the various stirred tanks.

The procedure is preferably to initially charge an aqueous solution comprising ligand L in a stirred vessel and, in a phase of step (C), to meter in a solution (B1) comprising nickel salt, manganese salt and optionally cobalt salt, and simultaneously solution (A). The metered addition is controlled such that the pH of the mother liquor is in the range from 10.5 to 11.3. Then a solution (B2) comprising nickel salt, manganese salt and optionally cobalt salt in a different molar composition is metered in, and simultaneously a further solution (A) comprising at least one alkali metal hydroxide or at least one alkali metal carbonate or at least one alkali metal hydrogencarbonate.

More preferably, the procedure is to initially charge an aqueous solution comprising ligand L in a stirred vessel and, in a phase of step (C), to meter in a solution (B1) comprising nickel salt, manganese salt and optionally cobalt salt, and simultaneously solution (A). The metered addition is controlled such that the pH of the mother liquor is in the range from 10.5 to 11.3. Then an aqueous solution (B1) and additionally aqueous solution (B2) comprising nickel salt, manganese salt and optionally cobalt salt in a different molar composition than (B1), and simultaneously a further solution (A) comprising at least one alkali metal hydroxide or at least one alkali metal carbonate or at least one alkali metal hydrogencarbonate, are metered in. The metered addition of aqueous solution (B2) may commence gradually or abruptly. The metered addition of aqueous solution (B2) can be effected in addition to the metered addition of aqueous solution (B1) or instead.

In one embodiment of the present invention, it is possible, if it is desirable to work with a batch reactor, to alter the concentration ratios of the transition metal cations not just once but several times.

For example, it is first possible to meter in only aqueous solution (B1), then aqueous solution (B2) and optionally aqueous solution (B1), then exclusively aqueous solution (B1) again, then aqueous solution (B2) again and optionally aqueous solution (B1), for example once or up to 20 times in alternation.

In another variant, the concentration ratios of the transition metal cations are changed more than once, by first metering in aqueous solution (B1) and aqueous solution (B2) in one ratio, then in another ratio, then in the first ratio again, then in the other ratio again, for example once or up to 20 times in alternation.

In a preferred embodiment, aqueous solutions (B1) and (B2) are metered in simultaneously at least for a period, in which case the two solutions are mixed prior to entry into the reactor, for example in a static mixer.

In one embodiment of the present invention, water is introduced into the stirred vessel continuously or for a period, for example in the range from zero to 300% by volume of the sum of all aqueous solutions (A), (B1) and (B2), preferably zero to 50%.

In one embodiment of the present invention, step (C) of the inventive production process is performed at temperatures in the range from 10 to 85° C., preferably at temperatures in the range from 20 to 50° C.

In one embodiment of the present invention, step (C) of the inventive production process is performed at a pH in the range from 7.5 to 12.5, preferably 11.3 to 12.0. The pH in the course of performance of step (C) may be essentially constant or increase by up to 0.2 unit or decrease by up to 1.0 unit or vary by up to 0.2 unit. In the case of precipitation of hydroxides, however, the pH does not go below the lower limit of 7.5 or above the upper limit of 12.5. If it is desirable to precipitate carbonates, it is preferable to work within a pH range of 7.5-8.5, each measured at 23° C. in the mother liquor.

In one embodiment of the present invention, step (C) of the inventive production process is performed at a pressure in the range from 500 mbar to 20 bar, preferably standard pressure.

During the performance of step (C) of the inventive production process, the feed rate of aqueous solution (B1) or (B2) may be constant in each case or changed within certain limits.

Step (C) of the inventive production process can be performed under air, under inert gas atmosphere, for example under noble gas or nitrogen atmosphere, or under reducing atmosphere. Examples of reducing gases include, for example, CO and $SO_2$. Preference is given to working under inert gas atmosphere.

During the performance of step (C), it is possible to draw off mother liquor from the stirred tank cascade or the batch reactor without withdrawing already precipitated particles. mother liquor refers to water, water-soluble salts and any further additives present in solution. Useful water-soluble salts include, for example, alkali metal salts of the counterions of transition metals, for example sodium acetate, potassium acetate, sodium sulfate, potassium sulfate, sodium nitrate, potassium nitrate, sodium halide, especially sodium chloride, potassium halide, and also additional salts, any additives used, and any excess alkali metal carbonate or alkali metal hydroxide, and also ligand L. In addition, the mother liquor may comprise traces of soluble transition metal salts. Examples of suitable apparatuses for drawing off mother liquor without withdrawing precipitated particles are sedimenters, inclined clarifiers, centrifuges, filters and clarifying apparatuses, and also separation apparatuses which utilize the density difference between mother liquor and particles.

In one embodiment of the present invention, an impact clarifier divided into two sections can be used to draw off mother liquor, in which not only precipitated particles but also gas bubbles introduced into the suspension by the stirring in the stirred vessel are removed.

In one embodiment of the present invention, the procedure is to produce aqueous solution (B2) in a vessel connected to the batch reactor and then to meter it into the batch reactor. For this purpose, for example, in the vessel connected to the batch reactor, aqueous solution (B1) can first be produced with a certain molar ratio of the transition metals and be metered into the batch reactor. Once a certain proportion of aqueous solution (B1) has been metered in, transition metal salts are added in a different molar ratio of the transition metals to produce aqueous solution (B2). Then aqueous solution (B2) is metered into the batch reactor. In this embodiment, aqueous solution (B2) preferably does not have a constant composition.

In one embodiment of the present invention, a third aqueous solution (B3) is provided, comprising transition metal cations in a molar ratio which differs from the molar ratio of the transition metal cations of aqueous solution (B1) and (B2), and it is metered into a third stirred tank of a cascade or at a different time into the batch reactor.

In one embodiment of the present invention, the procedure is that concentration of L and pH are selected such that the concentration of soluble $Ni^{2+}$ salts in the mother liquor is below 1000 ppm and the concentrations of soluble $Co^{2+}$ salts and $Mn^{2+}$ salts are each below 200 ppm, the concentration of soluble $Ni^{2+}$ salts in the mother liquor preferably being below 400 ppm and the concentrations of soluble $Co^{2+}$ salts and $Mn^{2+}$ salts each below 50 ppm. The lower limit for the sum total of soluble $Ni^{2+}$ salts, $Co^{2+}$ salts and $Mn^{2+}$ salts is in each case 5 ppm.

The concentration of L can remain constant or preferably vary during the performance of step L, and it is more preferably lowered, for example by adding less ligand L than is drawn off with mother liquor.

In one embodiment of the present invention, the method involves stirring to introduce an energy of more than 2 W/l, preferably more than 4 W/l, into the suspension which forms. In one variant, the energy input is altered during the reaction time; for example, it is possible to vary the energy input by stirring during the performance of the inventive production process. In a specific variant, the procedure is to work at higher mean stirrer input during the first third of the reaction time, for example at 8 W/l, than in the subsequent two thirds, for example at 4 W/l, 5.5 W/l or 6.3 W/l therein. In a preferred embodiment, a mean stirrer output of not more than 20 W/l is introduced.

In one embodiment of the present invention, step (C) can be performed over a duration of 30 minutes up to 48 hours when working in a batch reactor.

If it is desirable to work in a stirred tank cascade, the duration of step (C) is theoretically unlimited, and the mean residence time may be in the range from 30 minutes up to 48 hours.

In step (D) of the inventive production process, the inventive particles thus produced are removed, specifically from the mother liquor. The removal can be effected, for example, by filtration, centrifugation, decanting, spray drying or sedimenting, or by a combination of two or more of the aforementioned operations. Suitable apparatuses are, for example, filter presses, belt filters, spray dryers, hydrocyclones, inclined clarifiers or combinations of the aforementioned apparatuses.

To improve the removal, it is possible, for example, to wash with pure water or with an aqueous solution of alkali metal carbonate or alkali metal hydroxide, especially with an aqueous solution of sodium carbonate, potassium carbonate, sodium hydroxide, potassium hydroxide or ammonia. Water and aqueous solution of alkali metal hydroxide, especially of sodium hydroxide, are preferred.

The washing can be effected, for example, with employment of elevated pressure or elevated temperature, for example 30 to 50° C. In another variant, the washing is conducted at room temperature. The efficiency of washing can be checked by analytical measures. For example, the content of transition metal(s) in the washing water can be analyzed. In one variant, the electrical conductivity of the washing water can be measured.

If washing is effected with water rather than with an aqueous solution of alkali metal hydroxide, it is possible to check with the aid of conductivity studies on the washing water whether water-soluble substances, for example water-soluble salts, can still be washed out.

The removal of the inventive particles can be followed by drying. The drying can be performed, for example, with inert gas or with air. The drying can be performed, for example, at a temperature in the range from 30 to 150° C. If the drying is performed with air, it is observed in many cases that some transition metals are partially oxidized, for example $Mn^{2+}$ to $Mn^{4+}$ and $Co^{2+}$ to $Co^{3+}$, and blackening of the inventive particles is observed. It is preferable to dry with air.

Inventive particles are of good suitability for conversion to cathode materials for lithium ion batteries. The present invention therefore further provides for the use of inventive particles for production of lithium-containing mixed transition metal oxides. The present invention further provides a process for producing lithium-containing mixed transition metal oxides using inventive particles, also called inventive operation for short.

For performance of the inventive operation, the procedure may be, for example, to mix inventive particles with at least one lithium compound and to react them with one another at temperatures in the range from 500 to 1000° C.

Lithium compounds selected may preferably be lithium salts, for example $Li_2O$, $LiOH$, $LiNO_3$, $Li_2SO_4$, $LiCl$ or $Li_2CO_3$, in each case in anhydrous form or, if it exists, as the hydrate, preference being given to LiOH, for example as the monohydrate, and particular preference to $Li_2CO_3$.

The amounts of inventive particles and lithium compound are selected so as to obtain the desired stoichiometry of the cathode material. Preference is given to selecting inventive particles and lithium compound such that the molar ratio of lithium to the sum total of all transition metals and any M is in the range from 1:1 to 1.3 to 1, preferably 1.01 to 1 to 1.1 to 1.

The conversion at 500 to 1000° C. can be performed in a furnace, for example in a rotary tube furnace, in a muffle furnace, in a pendulum furnace, in a roller hearth furnace or in a push-through furnace. Combinations of two or more of the aforementioned furnaces are also possible.

The conversion at 500 to 1000° C. can be performed over a period of 30 minutes to 24 hours. It is possible to convert at one temperature or to run a temperature profile.

When the conversion is conducted at 500 to 1000° C., for example at 100° C. or at least 925° C., over a very long period, for example of 24 hours, diffusion of the cations of nickel, manganese, cobalt and any M can be observed. This diffusion may be desirable. For production of inventive spherical particles, however, it is preferable to conduct a conversion at 1000° C. or preferably 925° C. over a shorter period, for example 30 minutes to 4 hours. If production of inventive particles at 950° C. is desirable, preference is given to a period in the range from 30 minutes to 4 hours, and at a temperature of 900° C. a range from 30 minutes to 6 hours.

The performance of the inventive operation affords lithium-containing mixed transition metal oxides in particulate form, which likewise form part of the subject matter of the present invention.

The present invention especially provides lithium-containing mixed transition metal oxides in particulate form, also called inventive mixed oxides or inventive mixed transition metal oxides for short. It is a characteristic feature of inventive mixed oxides that they have cations of at least two transition metals selected from nickel, cobalt, manganese, titanium, vanadium, chromium and iron, wherein the concentration of at least one of the transition metal cations, plotted against the radius of the mixed transition metal oxide in question, has at least one relative extreme value.

Inventive mixed oxides are in the form of spherical particles. In this context—as is also the case for inventive particles—spherical particles shall include not just those which are exactly spherical but also those particles in which the maximum and minimum diameters of at least 95% (numerical average) of a representative sample differ by not more than 5%.

It is observed that the mobility of the transition metal ions within the particles is extremely low during the inventive operation. The statements made regarding homogeneity of the composition in connection with inventive particles thus applies correspondingly to inventive mixed oxides.

In one embodiment of the present invention, particles of inventive mixed oxide are present as agglomerates of primary particles. The primary particles may have, for example, a mean diameter in the range from 10 nm to 500 nm.

Particles of inventive mixed oxide may have a median diameter (D50) in the range from 0.1 to 35 μm, preferably 2 to 30 μm, measured, for example, by light scattering. Suitable equipment is commercially available, for example Malvern Mastersizer.

In one embodiment of the present invention, particles of inventive mixed oxide have a narrow particle diameter distribution. For instance, it is preferable that the following inequations are satisfied: $0.5 \cdot (D10) \geq (D50)$ and $(D90) \leq 1.7 \cdot (D50)$.

In one embodiment of the present invention, particles of inventive mixed oxide have a BET surface area of up to 10 $m^2/g$. Preferably, particles of inventive mixed oxide have a BET surface area of at least 0.1 $m^2/g$.

The present invention provides for the use of inventive mixed oxide as or for production of cathode material for lithium ion batteries.

Cathode material may, as well as inventive mixed oxide, comprise carbon in an electrically conductive polymorph, for example in the form of carbon black, graphite, graphene, carbon nanotubes or activated carbon.

Cathode material may further comprise at least one binder, for example a polymeric binder.

Suitable binders are preferably selected from organic (co)polymers. Suitable (co)polymers, i.e. homopolymers or copolymers, may be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

Polyacrylonitrile is understood in the context of the present invention to mean not only polyacrylonitrile homopolymers but also copolymers of acrylonitrile with 1,3-butadiene or styrene. Preference is given to polyacrylonitrile homopolymers.

In the context of the present invention, polyethylene is understood to mean not only homopolyethylene but also copolymers of ethylene which comprise at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not only homopolypropylene but also copolymers of propylene which comprise at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not only homopolymers of styrene but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binders are selected from those (co)polymers which have a mean molecular weight $M_w$ in the range from 50 000 to 1 000 000 g/mol, preferably to 500 000 g/mol.

Binders may be crosslinked or uncrosslinked (co)polymers.

In a particularly preferred embodiment of the present invention, binders are selected from halogenated (co)polymers, especially from fluorinated (co)polymers. Halogenated or fluorinated (co)polymers are understood to mean those (co)polymers comprising, in copolymerized form, at least one (co)monomer having at least one halogen atom or at least one fluorine atom per molecule, preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Electrically conductive carbonaceous material can be selected, for example, from graphite, carbon black, carbon nanotubes, graphene and mixtures of at least two of the aforementioned substances. In the context of the present invention, electrically conductive carbonaceous material can also be referred to as carbon (B) for short.

In one embodiment of the present invention, electrically conductive carbonaceous material is carbon black. Carbon black may be selected, for example, from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, electrically conductive carbonaceous material is partially oxidized carbon black.

In one embodiment of the present invention, electrically conductive carbonaceous material comprises carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

In the context of the present invention, graphene is understood to mean almost ideally or ideally two-dimensional hexagonal carbon crystals of analogous structure to individual graphite layers.

In one embodiment of the present invention the weight ratio of inventive mixed transition metal oxide and electrically conductive carbonaceous material is in the range from 200:1 to 5:1, preferably 100:1 to 10:1.

A further aspect of the present invention is a cathode comprising at least one mixed transition metal oxide produced as described above, at least one electrically conductive carbonaceous material and at least one binder.

Inventive mixed transition metal oxide and electrically conductive carbonaceous material have been described above.

The present invention further provides electrochemical cells produced using at least one inventive cathode. The present invention further provides electrochemical cells comprising at least one inventive cathode.

In one embodiment of the present invention, cathode material produced in accordance with the invention comprises:
in the range from 60 to 98% by weight, preferably 70 to 96% by weight, of inventive mixed transition metal oxide,
in the range from 1 to 20% by weight, preferably 2 to 15% by weight, of binder,
in the range from 1 to 25% by weight, preferably 2 to 20% by weight, of electrically conductive carbonaceous material.

The geometry of inventive cathodes can be selected within wide limits. It is preferable to configure inventive cathodes in thin films, for example in films with a thickness in the range from 10 μm to 250 μm, preferably 20 to 130 μm.

In one embodiment of the present invention, inventive cathodes comprise a foil or film, for example a metal foil, especially an aluminum foil, or a polymer film, for example a polyester film, which may be untreated or siliconized.

The present invention further provides for the use of inventive cathode materials or inventive cathodes in electrochemical cells. The present invention further provides a process for producing electrochemical cells using inventive cathode material or inventive cathodes. The present invention further provides electrochemical cells comprising at least one inventive cathode material or at least one inventive cathode.

Inventive electrochemical cells comprise a counterelectrode which, in the context of the present invention, is defined as the anode and which may, for example, be a carbon anode, especially a graphite anode, a lithium anode, a silicon anode or a lithium titanate anode.

Inventive electrochemical cells may, for example, be batteries or accumulators.

Inventive electrochemical cells may, as well as anode and inventive cathode, comprise further constituents, for example conductive salt, nonaqueous solvent, separator, output conductor, for example made of a metal or an alloy, and also cable connections and housing.

In one embodiment of the present invention, inventive electrical cells comprise at least one nonaqueous solvent which may be liquid or solid at room temperature, preferably selected from polymers, cyclic or noncyclic ethers, cyclic and noncyclic acetals, and cyclic or noncyclic organic carbonates.

Examples of suitable polymers are especially polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably doubly methyl- or ethyl-capped polyalkylene glycols.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (III) and (IV)

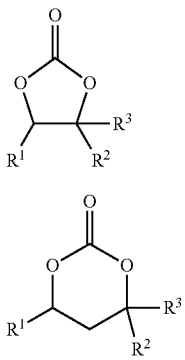

(III)

(IV)

in which $R^1$, $R^2$ and $R^3$ may be the same or different and are each selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

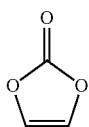

(V)

Preference is given to using the solvent(s) in what is called the anhydrous state, i.e. with a water content in the range from 1 ppm to 0.1% by weight, determinable, for example, by Karl Fischer titration.

Inventive electrochemical cells further comprise at least one conductive salt. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$ where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_tYLi$ where t is defined as follows:

t=1 when Y is selected from oxygen and sulfur,
t=2 when Y is selected from nitrogen and phosphorus, and
t=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, and particular preference is given to $LiPF_6$ and $LiN(CF_3SO_2)_2$.

In one embodiment of the present invention, inventive electrochemical cells comprise one or more separators by which the electrodes are mechanically separated from one another. Suitable separators are polymer films, especially porous polymer films, which are unreactive toward metallic lithium. Particularly suitable materials for separators are polyolefins, especially porous polyethylene films and porous polypropylene films.

Polyolefin separators, especially of polyethylene or polypropylene, may have a porosity in the range from 35 to 45%. Suitable pore diameters are, for example, in the range from 30 to 500 nm.

In another embodiment of the present invention, separators may be selected from PET nonwovens filled with inorganic particles. Such separators may have a porosity in the range from 40 to 55%. Suitable pore diameters are, for example, in the range from 80 to 750 nm.

Inventive electrochemical cells further comprise a housing which may be of any shape, for example cuboidal or in the shape of a flat cylinder. In one variant, the housing used is a metal foil elaborated as a pouch.

Inventive electrochemical cells give a high voltage and are notable for high energy density and good stability. More particularly, the inventive electrochemical cells have improved rate capability and cyclic stability, especially at relatively high operating temperatures (35-60° C.), without any disadvantages in terms of energy density.

Inventive electrochemical cells can be combined with one another, for example in series connection or in parallel connection. Series connection is preferred.

The present invention further provides for the use of inventive electrochemical cells in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

The use of inventive electrochemical cells in devices offers the advantage of a longer operating time prior to recharging. If the intention were to achieve an equal run time with electrochemical cells with lower energy density, a higher weight for electrochemical cells would have to be accepted.

The invention is illustrated further by working examples.

General remarks: liters should be understood to mean standard liters unless stated otherwise. Percentages in the context of the present invention are % by weight unless explicitly stated otherwise.

The element distribution in the precursors was determined by SEM-EDX (scanning electron microscopy with energy-dispersive x-ray spectroscopy).

I. Production of a Cathode Material

I.1 Production of a Precursor—Spherical Particles of Transition Metal Hydroxides The examples and comparative examples were conducted in a reactor system having a total volume of 8 l, and the reactor system comprised a stirred tank having a volume of 7 l and a solid/liquid separation apparatus which took the form of a combination of inclined clarifier with sedimenter, having a volume of 1 l. Using the separation apparatus, it was possible during the reaction to draw liquid phase off from the stirred tank using a pump without simultaneously withdrawing solids.

At the start, the reactor system was filled with 8 l of ammonium sulfate solution (concentration 36 g of $(NH_4)_2SO_4$/kg of solution) and heated to 45° C.

The contents of the stirred tank were mixed constantly during the reaction, expending mechanical work of about 45 watts on the contents. The specific power input in the stirred tank was thus about 6.4 watts per liter. In the separation apparatus, no stirrer output was introduced.

The reactor system was equipped with a pitched blade stirrer and baffles. The stirrer power was measured using an electric motor with torque measurement from speed and torque. In addition, the reactor system had several metering units with metering pumps, and also an electrode for pH measurement and a temperature sensor. In addition, a fill level sensor was present in the stirred tank, and this regulated the discharge pump at the liquid-side connection of the separation apparatus such that the level in the stirred tank remained essentially constant. Solids are recycled from the separation apparatus back into the reactor.

The gas space (2 l) in the reactor system was purged with 40 l/h of nitrogen during the performance of the precipitation.

The following aqueous solutions were used:

Aqueous solution (A): comprised 5.59 mol of NaOH per kg of solution and 1.55 mol of $NH_3$ per kg of solution, produced from 25% by weight of aqueous NaOH and 25% by weight of aqueous ammonia solution.

Aqueous solution (B1): comprised 1.275 mol per kg of solution of nickel sulfate and 0.375 mol per kg of solution of cobalt sulfate, produced by dissolving the corresponding hydrate complexes in water.

Aqueous solution (B2): comprised 0.579 mol per kg of solution of nickel sulfate, 0.347 mol per kg of solution of cobalt sulfate and 0.724 mol per kg of solution of manganese sulfate, produced by dissolving the corresponding hydrate complexes in water.

Aqueous solution (C): comprised 6.25 mol of NaOH per kg of solution.

Aqueous solutions (A), (B1) and (B2) were metered in by means of metering pumps; solution (C) was metered in such that the pH in the stirred tank remained constant (pH regulation).

Experimental Procedure

The abovementioned ammonium sulfate solution was adjusted to pH 11.82, measured at 23° C., by adding solution (C). Then metering pumps were used to meter solutions (B1), (B2) and (A) into the turbulent zones close to the stirrer blades of the stirred tank of the reactor system at constant mass flow rate (780/170/516 g/h). Solutions (B1) and (B2) were premixed in a static mixer prior to entry into the reactor. By means of a regulating device, the pH was kept constant at 11.82 (measured at 23° C.) by means of addition of solution (C). A suspension was formed (molar ratio in the particles: Ni:Co:Mn=70:22:8). After 6 hours, the flow rates of (B1) and (B2) were altered such that a flow rate of 170 g/h in the case of (B1) and 780 g/h in the case of (B2) had been attained after 3 hours (molar ratio Ni:Co:Mn=43:21:36). The flow rates were changed in a linear manner, i.e. with a constant change in the flow rates per unit time. Then the flow rates (B1) and (B2) were left at 170 g/h or 780 g/h respectively for 1 hour. This was followed by further changes in the flow rates:

Linear change over 3 hours to 780 g/h (B1) and 170 g/h (B2),
Flow rates constant for 1 hour of 780 g/h (B1) and 170 g/h (B2),
Linear change over 3 hours to 170 g/h (B1) and 780 g/h (B2)
Flow rates constant for 3 hours of 170 g/h (B1) and 780 g/h (B2)
Linear change over 3 hours to 780 g/h (B1) and 170 g/h (B2)
Flow rates constant for 3 hours of 780 g/h (B1) and 170 g/h (B2)
Linear change over 3 hours to 170 g/h (B1) and 780 g/h (B2)
Flow rates constant for 4 hours of 170 g/h (B1) and 780 g/h (B2).

The overall run time was 33 hours, then the mixture was stirred without a feed for another 15 min.

This gave a suspension of transition metal hydroxide which had a molar Ni:Co:Mn ratio of 57:22:21. The transition metal hydroxide suspension obtained as reactor contents (contents of stirred vessel and clarifying apparatus) was filtered through a suction filter, and the filtercake was washed with water and dried at 105° C. over a period of 18 hours. The inventive particles thus obtainable had a composition of 37% by weight of nickel, 14.6% by weight of cobalt and 12.9% by weight of manganese, based in each case on the particles, and were in partly oxidized form. The particles were sieved (mesh size 32 μm; coarse material: 0.2%) and the tamped density was determined (2.12 kg/l). A portion was suspended in water and the particle size was determined by light scattering (Malvern Mastersizer 2000). The median particle size D50 was 12.4 μm, with narrow particle diameter distribution (D10=9.1 μm; D90=16.9 μm).

The inventive particles of transition metal hydroxide had, determined over the radius, 3 relative maxima of nickel— with 3 relative minima of manganese—which were neither at the edge nor in the center of the particle in question. The concentration of cobalt was constant in each case.

I.2 Production of an Inventive Lithiated Mixed Transition Metal Oxide

The particles thus obtained were mixed intimately with finely ground lithium carbonate, and the molar ratio of lithium to the sum total of the transition metals present was 1.03. A portion (40 g) of this mixture was treated thermally in a muffle furnace in oxygen atmosphere (maximum temperature: 900° C.). About 30 g of inventive active material (AM.1) were obtained. This was sieved (mesh size 32 μm; no coarse material). A virtually agglomerate-free powder was obtained, which was processible to give inventive electrodes.

Particle size (D50), tamped density and residual content of lithium carbonate ($Li_2CO_3$) were determined in the inventive active material. Particle diameter D50: 14.1 μm; tamped density: 2.34 kg/l; $Li_2CO_3$: 0.23% by weight.

II. General Method for Production of Inventive Electrodes and Inventive Electrochemical Cells Materials Used:

Binder (BM.1): Polymer of vinylidene fluoride, as a solution, 10% by weight in NMP, powder commercially available as Kynar® HSV900 from Arkema, Inc.

Electrically Conductive Carbonaceous Materials:

Carbon 1: Carbon black, BET surface area of about 60 $m^2$/g, commercially available as "Super C65" from Timcal Carbon 2: Graphite, commercially available as "SFG6L" from Timcal Figures in % relate to percent by weight unless explicitly stated otherwise.

General Method Using the Example of Inventive Active Material (AM.1):

0.87 g of carbon 1, 1.46 g of carbon 2 and 17.25 g of binder (BM.1) were mixed with addition of 19.5 g of N-methylpyrrolidone (NMP) to give a paste. In a next step, 4.35 g of this paste were mixed with 6.0 g of inventive active material (AM.1). An aluminum foil of thickness 30 μm was coated with the above-described paste (active material loading about 12 mg/$cm^2$). After drying at 105° C., circular parts of the aluminum foil thus coated (diameter 17.5 mm) were punched out. The electrodes thus obtainable were used to produce inventive electrochemical cells EC.1.

The electrolyte used was a 1 mol/l solution of $LiPF_6$ in ethylene carbonate/diethyl carbonate (1:1 based on parts by mass), which additionally comprised 2% by weight of vinylidene carbonate. The anode consisted of a graphite-coated copper foil which was separated from the cathode by a separator made from glass fiber paper.

Subsequently, the cells were assembled at room temperature and cycled at 60° C. The cycling current was 75 A/kg, based on the active material of the cathode, and the rate capability was also determined at 150 Ah/kg, 300 Ah/kg and 450 Ah/kg at intervals of about 50 cycles. The voltage range selected was 2.8 volts to 4.1 volts.

The charging was conducted at 75 A/kg until the upper switch-off voltage had been attained, then charging was effected at constant voltage for another 30 minutes. The discharging was always conducted only until the lower switch-off voltage had been attained.

EC.1: Cell comprises inventive material.

C-EC.1: Cell comprises a material having mean composition comparable to inventive material but a transition metal composition which changes constantly in the radial direction without an extreme value. Particle diameter D50: 15.4 µm; tamped density: 2.21 kg/l; $Li_2CO_3$: 0.24% by weight. For the rest, the electrodes and cells correspond to those according to the invention.

C-EC.2: Cell comprises a material having mean composition comparable to inventive material, but an essentially constant transition metal composition in the radial direction. Particle diameter D50: 13.2 µm; tamped density: 2.22 kg/l; $Li_2CO_3$: 0.25% by weight. For the rest, the electrodes and cells corresponds to those according to the invention.

TABLE 1

Capacity (discharge, A · h/kg) of inventive electrochemical cells and comparative cells

| Cycle | EC.1 | C-EC.1 | C-EC.2 |
|---|---|---|---|
| 10 | 158 | 160 | 155 |
| 100 | 148 | 148 | 144 |
| 200 | 139 | 137 | 136 |
| 250 | 135 | 132 | 132 |

The invention claimed is:

1. Spherical particles of transition metal carbonates, transition metal hydroxides or transition metal carbonate hydroxides comprising cations of at least two transition metals selected from nickel, cobalt, manganese, titanium, vanadium, chromium and iron, wherein the concentration of at least one of the transition metal cations, plotted against the radius of the particles, has at least one relative extreme value which is neither in the center nor at the edge of the particle, wherein at least one of the transition metals is cobalt, wherein the spherical particles have a constant concentration of cobalt throughout a diameter of the spherical particle.

2. Spherical particles according to claim 1, wherein the concentration of the cations of at least two transition metals, plotted against the radius of the particles, has at least one relative extreme value in each case which is neither in the center nor at the edge of the particle.

3. Spherical particles according to claim 1, wherein the concentration of the cations of at least one of the transition metals, plotted against the radius of the particle, has at least one turning point.

4. Spherical particles according to claim 1, which include cations of nickel, cobalt and manganese and optionally at least one further transition metal.

5. Spherical particles according to claim 1, wherein the concentration of nickel is within a range from 40 to 80 mol %, determine over the radius of the particles.

6. Spherical particles according to claim 1, wherein the concentration of the cations of at least one of the transition metals changes within the particle in the manner of a constant function or in steps of not more than 10 mol %.

7. Spherical particles according to claim 1, which have a median diameter (D50) in the range from 1 to 30 µm.

8. Spherical particles according to claim 1, which have a constant concentration of manganese over the diameter.

9. A process for producing spherical particles according to claim 1 having the following steps:
(A) providing an aqueous solution of at least one alkali metal (hydrogen)carbonate or at least one alkali metal hydroxide and optionally at least one compound L,
(B) providing at least two aqueous solutions (B1) and (B2) of transition metal salts which comprise at least two transition metals overall, the aqueous solutions (B1) and (B2) having different molar ratios of the transition metals,
(C) performing a precipitation of mixed transition metal carbonates, transition metal hydroxides or transition metal carbonate hydroxides in a stirred tank cascade of at least two stirred tanks or in a batch reactor, bringing about precipitations at different transition metal concentrations by
(C1) feeding solutions (B1) and (B2) into various stirred tanks of the stirred tank cascade or by
(C2) feeding solutions (B1) and (B2) into the batch reactor at different times or in different amounts,
(D) removing the spherical particles thus precipitated.

10. A method for production of lithiated mixed transition metal oxides comprising converting the spherical particles according to claim 1 into lithiated mixed transition metal oxides.

11. A process for producing lithiated mixed transition metal oxides, which comprises mixing spherical particles according to claim 1 with at least one lithium compound selected from LiOH, $Li_2O$ and $Li_2CO_3$, and reacting them with one another at a temperature in the range from 600 to 1000° C.

12. A lithiated mixed transition metal oxide in particulate form having cations of at least two transition metals selected from nickel, cobalt, manganese, titanium, vanadium, chromium and iron, wherein the concentration of at least one of the transition metal cations, plotted against the radius of the mixed transition metal oxide, has at least one relative extreme value which is neither in the center nor at the edge of the particle, wherein at least one of the transition metals is cobalt, wherein the spherical particles have a constant concentration of cobalt throughout a diameter of the spherical particle.

13. The lithiated mixed transition metal oxide according to claim 12, wherein the concentration of the cations of at least two transition metals plotted against the radius of the particle have at least one relative extreme value in each case which is neither in the center nor at the edge of the particle.

14. The lithiated mixed transition metal oxide according to claim 12, wherein the concentration of the cations of at least one of the transition metals plotted against the radius of the particle has at least one turning point.

15. The lithiated mixed transition metal oxide according to claim 12, which includes cations of nickel, cobalt and manganese and optionally at least one further transition metal in ionic form.

16. The lithiated mixed transition metal oxide according to claim 12, wherein the concentration of nickel is within a range from 40 to 80 mol %, determined over the radius of the particles.

17. The lithiated mixed transition metal oxide according to claim 12, wherein the concentration of the cations of at least one of the transition metals changes within the particle in the manner of a constant function or in steps of not more than 10 mol %.

18. A method for production of cathodes for lithium ion batteries comprising converting the lithiated mixed transition metal oxide according to claim 12 into a cathode.

* * * * *

UNITED STATES PATENT AND TRADEMARK OFFICE
CERTIFICATE OF CORRECTION

| | |
|---|---|
| PATENT NO. | : 10,069,144 B2 |
| APPLICATION NO. | : 14/889663 |
| DATED | : September 4, 2018 |
| INVENTOR(S) | : Simon Schroedle et al. |

Page 1 of 1

It is certified that error appears in the above-identified patent and that said Letters Patent is hereby corrected as shown below:

On the Title Page

Column 2, Line 14, "LiNi$_{0.50}$" should read --LiNi$_{0.80}$--

Column 2, Line 18, "cobolt" should read --cobalt--

Column 2, Line 21, "Mn$_{0.10]O2}$" should read --Mn$_{0.10]}$O$_2$--

Column 2, Line 28, "Mn$_{0.18]O2}$" should read --Mn$_{0.18]}$O$_2$--

On page 2, Column 1, Line 5, "LiNi$_{0\ 96}$" should read --LiNi$_{0.96}$--

Signed and Sealed this
Seventeenth Day of March, 2020

Andrei Iancu
*Director of the United States Patent and Trademark Office*